3,324,069
VINYLIDENE FLUORIDE POLYMER DISPERSIONS
Frank F. Koblitz, Erdenheim, and Robert G. Petrella, Philadelphia, Pa., assignors to Pennsalt Chemicals Corporation, Philadelphia, Pa., a corporation of Pennsylvania
No Drawing. Filed Oct. 23, 1964, Ser. No. 406,153
9 Claims. (Cl 260—31.4)

ABSTRACT OF THE DISCLOSURE

Compositions comprising (a) a fluorinated olefin polymer containing at least about 90% by weight of vinylidene fluoride moieties, (b) a latent solvent for the fluorine containing polymer and (c) an acrylate polymer, the acrylate polymer being dissolved in the latent solvent, the fluorine containing polymer being dispersed in the acrylate solution, the total polymers comprising from about 20% to about 60% by weight of the composition, and the acrylate polymer being from about 1% to about 25% by weight of the total polymers.

---

Dispersions of polyvinylidene fluoride are known and are useful for making cast films and protective coatings which may be applied in a variety of ways. However, because of the nature of polyvinylidene fluoride its adhesive properties to most substrates is rather poor. This disadvantage has been overcome by certain techniques, as for example by the method disclosed in U.S. Patent 3,111,426 which employs an epoxy resin primer, but there still remains the need for dispersions of polyvinylidene fluoride which may be applied by conventional techniques and which will have excellent bonding characteristics to the substrate to which it is applied. This invention provides novel compositions containing polyvinylidene fluoride in dispersion form, which compositions have excellent adhesive characteristics and which are adaptable to high-speed coating equipment conventionally used in the industry. Furthermore, the compositions of this invention will be more economical to use than previously available polyvinylidene fluoride coating compositions, and because the compositions have high solids content, they are useful for high buildup applications by simple techniques.

In accord with the invention, there is provided novel compositions comprising (a) a fluorinated olefin polymer containing at least about 90% by weight of vinylidene fluoride moieties, (b) a latent solvent for such fluorine-containing polymer, (c) an acrylate polymer derived from a monomer of structure

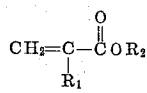

where $R_1$ is selected from the group consisting of hydrogen and methyl, and $R_2$ is alkyl containing from one to four carbon atoms, said acrylate polymer being dissolved in said latent solvent, said fluorine-containing polymer being dispersed in said acrylate solution, said total polymers comprising from about 20% to about 60% by weight of said composition, and said acrylate polymer being from 1% to about 25% by weight of said total polymer.

It will be understood from the above broad description of the invention that, in effect, the novel compositions of the invention are dispersions of a polyvinylidene fluoride-containing polymer in a solution of acrylate polymer dissolved in a latent solvent for the polyvinylidene fluoride composition. Once such dispersions are coated onto the substrate and subjected to baking to drive off the solvents of the composition, the resultant film that is obtained appears to be a true solution of the polyvinylidene fluoride composition with the acrylate polymer. Such solutions may be termed "alloys" and are of the type described in U.S. Ser. No. 387,193, filed Aug. 3, 1964. The high compatibility of the polyvinylidene fluoride composition with the acrylates is a surprising and unique phenomenon, since it has been found that other fluorinated polymers, as for example, polytetrafluoroethylene, polychlorotrifluoroethylene, and even polymers as closely related as polyvinyl fluoride do not display this high compatibility with these polyacrylate polymers.

As indicated, the polyvinylidene fluoride resin dispersed in the composition of the invention will be a polymer containing at least about 90% by weight of vinylidene fluoride moiety, and preferably will be the homopolymer of vinylidene fluoride. Useful copolymers will include those where the minor constituent is a fluorinated comonomer, as for example, tetrafluoroethylene, hexafluoropropene, chlorotrifluoroethylene, vinyl fluoride, and the like. Such copolymer compositions are well known in the art and may be prepared by any of the conventional methods, as for example those techniques disclosed in U.S. 2,435,537, 3,031,437 and copending application Ser. No. 32,591, filed May 31, 1960 by Murray Hauptschein.

The acrylates which will be used in the compositions of the invention are those derived from a monomer having the structure

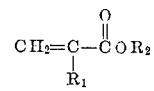

where $R_1$ is selected from the group consisting of hydrogen and methyl, and $R_2$ is lower alkyl; that is, an alkyl radical containing from one to four carbon atoms. When $R_1$ contains more than four carbon atoms, the product dispersion results in films and coatings which are hazy, thus showing the incompatibility of such acrylates with polyvinylidene fluoride. The preferred acrylate which will be employed in the invention is polymethylmethacrylate, although copolymers of two or more different monomers of the above structure are useful, as are also, the copolymers obtained from a monomer of the above structure with other ethylenically unsaturated compounds. Useful copolymers will be those containing from 10% to 40%, preferably from 10% to 20% by weight, of a comonomer, and such comonomers other than those having the above structure, are exemplified by acrylic acid, methacrylic acid, acrylonitrile, methylacrylate, ethylacrylate, ethylmethacrylate, butylacrylate, butylmethacrylate, styrene, α-methyl styrene, and the like. The preferred acrylate copolymer compositions will be a copolymer of methylmethacrylate and butylmethacrylate.

The above acrylic polymers are the well known acrylic thermoplastic resins, but this invention also embodies the use of the recently developed acrylic thermosetting resins. The thermosetting acrylic resins incorporate cross-linking sites and upon the application of heat, they cure to the final resin. Such acrylics also may embody other thermosetting resins such as epoxies, melamine, urea-formaldehyde compositions and the like and these modified acrylics are also useful in the invention. These polymers contribute to an increase in the softening temperature of the alloys as well as improved adhesion to substrates. Although they are not themselves as chemically resistant and resistant to heat and weathering as polyvinylidene fluoride, they surprisingly do not detract significantly from the performance of vinylidene fluoride in their alloys.

As will be understood from the above description, the liquid vehicle for this invention is non-aqueous and comprises a latent solvent for the polyvinylidene fluoride.

Latent solvents for polyvinylidene fluoride are defined in this invention as those organic liquids which have no appreciable solvent action for the polymer at temperatures below about 40° C. but show solvent action for it at higher temperatures. As indicated above, the latent solvents of this invention will be true solvents for the acrylate resins discussed above. Examples of such latent solvents are ketones, such as acetone, ethyl amyl ketone, methyl ethyl ketone, diacetone alcohol, cyclohexanone, isophorone, mesityloxide, 4-methoxy-4-methyl pentanone-2, and the like; alkyl and alkoxy esters of aliphatic and aromatic acids such as dimethyl adipate, dimethylsebacate, diethylsuccinate, dimethyl phthalate, 2-methoxyethyl acetate, 2-butoxyethyl acetate, dimethoxyethyl phthalate, and the like; glycol ethers and esters such as diethylene glycol monoethyl ether acetate, diethylene glycol monobutyl ether acetate, etc.; cyclic ethers such as dioxane, tetrahydrofuran, etc.; carbonate esters such as ethylene carbonate, propylene carbonate and the like; lactones such as butyrolactone and the like; and nitroalkanes such as 1-nitropropane, 2-nitropropane, nitromethane, and the like. It will be understood that in addition to using a single latent solvent, mixtures of certain latent solvents will be employed and in some cases, mixtures are preferred latent solvent combinations. The latent solvent will, of course, completely dissolve the acrylate polymer at room temperature, but since the polyvinylidene fluoride composition will be insoluble, it will be dispersed in the acrylate solution. Certain groups of latent solvents are preferred and the preferred groups will include esters, such as dimethylphthalate, dimethylsuccinate, and other well known dibasic acid alkyl esters; glycol ethers, such as ethylene glycol monoethyl ether acetate, diethylene glycol monoethyl ether acetate, diethylene glycol monobutyl ether acetate, and the like; ketones, such as acetone, isophorone diacetone alcohol, and similar ketones. Preferred combinations of latent solvents include diethylene glycol monoethyl ether acetate and dimethylphthalate, isophorone and dimethylphthalate, cyclohexanone and dimethylphthalate, cyclohexanone and diethylene glycol monoethyl ether acetate, and ethylene glycol monobutyl ether acetate and dimethylphthalate. It will also be understood that in addition to the latent solvent another volatile liquid may be present, as for example benzene, toluene, xylene, etc., which may be used to adjust the viscosity of the composition.

The concentrations of the acrylate polymer and the polyvinylidene fluoride polymer in the composition of the invention is important in order to obtain the beneficial effects with the composition of the invention. The total weight of polymers in the composition will be between about 20% and about 60% by weight of said composition. The acrylate polymer will comprise from about 1% to about 25% by weight of the total polymers, the balance being polyvinylidene fluoride. At least about 1% of the acrylate is needed to impart the desirable properties residing in the composition of the invention, whereas more than about 25% causes a significant reduction in the properties usually attributable to polyvinylidene fluoride. The acrylates themselves are not characterized by high chemical resistance or other properties normally residing in fluorocarbon polymers and it is therefore surprising that the physical properties of the films and coatings obtainable from the composition of the invention such as chemical resistance, impact resistance, toughness, percent elongation, electrical properties, and the like, are all on the order of those properties inherent in the homopolymer of polyvinylidene fluoride. Expressed another way, the presence of the acrylates does not significantly degrade the fluorocarbon polymers, but in fact, upgrades them by imparting film clarity, improved adhesion, improved ease of application and lower cost. The compositions of the invention are readily made by standard techniques that may employ ball-milling or high shear mixing procedures. In a preferred procedure, the ingredients, that is, the polyvinylidene fluoride, the acrylate polymer, and the latent solvent are simply ball milled at room temperature with or without a dispersion aid which may be used at a concentration of about 0.05% to 0.5% by weight of the total composition. Dispersion aids will include such readily available compositions as sulfonate alkyl esters (sodium dioctylsulfosuccinate), polyalkylene glycol esters, or any other of the well known anionic, cationic or nonionic dispersants. It is generally desirable to mix the ingredients under conditions which will minimize a temperature rise and ball milling is the preferred technique. However, electric mixing devices such as blenders and other high shear mixing equipment may be used, but with such equipment it is desirable to control the temperature so that no large temperature increase results. A temperature rise is undesirable because of the high viscosity of the composition which may result when the temperature rises above 125° F., since above this temperature the latent solvents begin to solvate and gel the dispersions. After thorough mixing or milling, the product composition is a white, viscous liquid having a bland, slightly acrylic ester odor. Generally, the viscosity of the composition will be from between about 500 to 125,000 cp. as measured by a Brookfield LVT Viscometer (TE spindle, 3 r.p.m.). The compositions with the lower viscosities will be used for film and thin coatings whereas the high viscosity compositions will be preferred for high buildup coatings on tanks and chemical process equipment. The composition is ready for use and may be applied to metal, wood, glass, plastic and other substrates by any of the well known techniques of dipping, spraying, painting, roller coating, and the like. After application, the substrate is subjected to a heat treatment to drive off the solvent system and subject the polymers to coalescence whereby the "alloy" composition is obtained. The heating temperatures will range from about 125 to about 300° C., and preferably will be between about 175 and 275° C.

Alternatively, the composition of the invention may be cast and subjected to heating to obtain a free film of the "alloy" composition.

The film or coating obtained is flexible, chemical resistant, weather resistant, relatively hard, creep resistant (that is, dimensionally stable), and adherent to substrates. In addition, the composition is easily handled because it has exceptionally good flow characteristics and may be employed with high speed coating equipment and can be used to build up relatively thick films when desired. Another advantage of the composition is that its cost is much less than polyvinylidene fluoride alone, since the acrylate additive is relatively low in cost and its presence reduces the overall cost of the product.

In order to further illustrate the invention, the following examples are given:

*Example 1*

The following mixture is ball milled for 16 hours (29 r.p.m.):

Parts by weight
Micro-ground polyvinylidene fluoride powder (average particle size 1 to 3 microns diameter) _____ 40
Acrylic polymer consisting essentially of a methyl methacrylate-ethylacrylate copolymer, but being predominantly methylmethacrylate _____ 10
Toluene _____ 15
Diethylene glycol monoethyl ether acetate _____ 26
Dimethylphthalate _____ 9
Anionic dispersant (sodium dioctylsulfosuccinate) __ 0.1

NOTE: The acrylic polymer is added as a 40% by weight solution in toluene.

The product obtained is a white, slightly bluish tinted dispersion having a Brookfield viscosity of 44,322 cps. (TE spindle, 3 r.p.m.). A film was prepared from the dispersion by casting the liquid on a chromium plated brass plate with a .010 in. clearance doctor blade, and on chromate treated aluminum sheets and baking the wet films at 400° F. for 20 min. Physical tests were made on the free film and the film on the aluminum surface and compared with films and coatings made in a similar manner from a dispersion devoid of polyacrylate made by similarly ball milling a mixture of 52% by weight polyvinylidene fluoride, 36% diethylene glycol monoethyl ether acetate, 12% dimethylphthalate and 0.1% of a cationic dispersant ("Catanac" L5—American Cyanamid Co.). The following table indicates the comparative physical properties:

TABLE I

|  | Polyvinylidene Fluoride-Polyacrylate Film | Polyvinylidene Fluoride Film |
| --- | --- | --- |
| Appearance | Glossy with slight haze | Glossy with slight haze. |
| Tensile Strength (lbs./sq. in.) | 4,260 (yield), 3,320 (break) | 4,570 (yield), 4,700 (break). |
| Elongation (percent) | 179 | 262. |
| Mandrel Bend (⅛″) | O.K. | Film turned opaque and lifted. |
| Effect of Boiling Water (Time)? | No effect | Film lifted completely from substrate. |
| Adhesion test [1] | 0/16 | 16/16. |

[1] 16 1-mm. squares cut in film on surface; scotch tape used to pull off squares; reported as number pulled off/16.

*Example 2*

The following mixture is ball milled for 16 hours at 20 r.p.m.:

| | Parts by weight |
| --- | --- |
| Micro-ground polyvinylidene fluoride powder (average particle diameter—1 to 3 microns) | 31.72 |
| Acrylic polymer consisting of a methylmethacrylate-ethylacrylate copolymer, but being predominantly methylmethacrylate | 7.94 |
| Toluene | 11.89 |
| Dimethylphthalate | 38.76 |
| Diisobutylketone | 9.67 |

The product obtained is a white dispersion having a viscosity of 9,450 cps. The dispersion is sprayed at a wet thickness of approximately 0.010 in. to yield a dry thickness of .002 to .003 in. on aluminum panels and heated 20 min. at 400° F. The coated panels are then subjected to chemical resistance tests. The data obtained and comparisons with panels coated similarly with (a) a standard polyvinylidene fluoride dispersion and (b) polymethylmethacrylate are given in the following table:

TABLE II.—TEST PANELS COATED WITH VARIOUS POLYMERS AND IMMERSED FOR ONE WEEK AT ROOM TEMPERATURE IN VARIOUS CHEMICALS

| Chemical Agent | Vinylidene Fluoride Homopolymer | Alloy of Example 2 | Methylmethacrylate Homopolymer |
| --- | --- | --- | --- |
| Trichloroethylene | No visible effect | No visible effect | Film dissolved. |
| Ethyl acetate | do | do | Do. |
| Xylene | do | do | Do. |
| Acetone | do | do | Do. |
| Dioxane | do | do | Do. |

*Example 3*

A mixture of 38.9% weight parts of polyvinylidene fluoride, 7.5 weight parts, 50% thermosetting acrylic resin consisting of a blend of hydroxylated acrylic copolymer with a melamine formaldehyde resin in 78/22 xylol/butanol; 0.6 part epoxy resin (Bisphenol A type monomeric with an epoxy assay of 185–195 g./g. mole); 39.6 parts diethylene glycol monoethyl ether acetate; 13.2 parts dimethylphthalate; are stirred for three minutes in a high shear blender at approximately 10,000 r.p.m. with care to keep the temperature below 50° C. The mass is then filtered through a 200 mesh screen.

Viscosity as measured by Bookfield viscometer on a Helipath stand using TD spindle is 37,100 cp.

Films are cast on chrome plated brass plates and baked 20 minutes at 400° F., in a circulating air oven, followed by quenching in water at 0° C. The films are stripped from the plates and tested by ASTM tests to give results as follows: tensile strength (yield: 4670 break—4320 p.s.i.); 391% elongation at break; $2.2 \times 10^{15}$ ohm-in. volume resistivity.

*Example 4*

Example 3 is repeated using finer powder of polyvinylidene fluoride (average particle diameter range 1 to 3 microns). The product obtained has the following properties:

| | |
| --- | --- |
| Dispersion viscosity | 35,000 cp. |
| Tensile strength | 4,000 at yield; 4,050 at break. |
| Percent elongation at break | 420. |
| Volume resistivity | $2.3 \times 10^{15}$ ohm-in. |

*Example 5*

Example 3 is repeated using a melamine formaldehyde modified hydroxylate acrylic resin. The physical properties of the product are as follows:

| | |
| --- | --- |
| Dispersion viscosity | 8,330 cp. |
| Tensile strength | 4,640 at yield; 4,060 at break. |
| Percent elongation at break | 226. |
| Volume resistivity | $2.76 \times 10^{15}$ ohm-in. |

*Example 6*

The product of Example 3 is used to cast films as free films and as a corrosion resistant coating on chromate treated aluminum sheet. The films and coatings are quenched in 25° C. water.

| | |
| --- | --- |
| Tensile strength of film | 4,580 at yield; 4,680 at break. |
| Percent elongation at break | 103. |
| Volume resistivity | $1.73 \times 10^{15}$ ohm-in. |

The coatings are very glossy and tough but springy rather than extremely hard.

| | |
| --- | --- |
| Pencil hardness | 4B. |
| Flexibility | Passes Mandrel bend—⅛″ Mandrel. |

Example 7

The following mixture is ball milled for 16 hr. (29 r.p.m.):

| | Parts by weight |
|---|---|
| Polyvinylidene fluoride powder (1–3 microns particle diameter) | 45 |
| Poly-n-butyl methacrylate, polymer (inherent viscosity of 0.5% solution in chloroform at 20° C. is 0.53) | 5 |
| Isophorone | 37.5 |
| Dimethylphthalate | 12.5 |

The product obtained is a white dispersion with a viscosity in the 5,000 to 10,000 cp. range.

When used as a coating as in Example 2 above, strongly adherent, abrasion resistant coatings are obtained.

Example 8

Example 1 is repeated using isophorone instead of the diethylene glycol monoethyl ether acetate and dimethylphthalate.

The product obtained, although slightly cream colored, is not observable in the tough, transparent, free films and coatings obtained by the method of Example 1.

Example 9

Example 1 is repeated using diethylene glycol monoethyl ether acetate as the sole dispersing liquid, the dimethylphthalate being omitted.

The dispersion obtained is very finely dispersed, bluish white, and has a low viscosity (~5,000 cp.) with a slight tendency to particle settling on storage. Tough, transparent films and coatings are obtained using the coating methods of Example 1.

Example 10

Example 1 is repeated using dimethylphthalate as the only added dispersing liquid.

A very white opaque somewhat tacky dispersion is obtained with very high viscosity (~200,000 cp.). This high viscosity is caused by the high degree of solvation of the resin particles.

This dispersion is unsuitable for use as a film casting formulation except when reduced in viscosity by other less active solvents such as xylene, methyl isobutyl ketone, or butoxyethyl acetate. When reduced to approximately 30,000 cp. by the addition of methyl isobutyl acetate tough transparent films are obtained using the method of Example 1.

This dispersion gives .005 to .010 in. thick baked coatings on aluminum and steel when sprayed with a single pass of the spray gun. The high viscosity and thixotropy of the dispersion allows high build non-sag characteristics in wet coatings on vertical surfaces. Coatings sprayed to a wet thickness of 0.025 in. on vertically supported chromate treated 4" x 12" aluminum panels cure transparent, tough and tightly adherent when baked at 525° F. for 5 min.

Example 11

Forty-six parts by weight of a commercially prepared polyvinylidene fluoride dispersion consisting of polyvinylidene fluoride powder with an intrinsic viscosity at 25° C. in N,N-dimethylacetamide of 1.2 and particle diameters of 95% in the 1 to 3 micron range are dispersed by high shear miving in 56 parts by weight of a solvent mixture consisting of a 4 to 1 wt./wt. mixture of dimethylphthalate and diisobutylketone.

A. One hundred ninety-six parts by weight of the above dispersion and 1.7 parts by weight of a methyl methacrylate polymer are stirred together until the acrylic pwoder is completely in solution by visual judgment. The dispersion is then placed in a ball mill jar and roller milled for fifteen minutes. The methyl methacrylate polymer used is a homopolymer with an intrinsic viscosity of 0.245 in toluene at 30° C.

B. A second formulation is made using 190 parts by weight of a polyvinylidine fluoride disperson and 4.6 parts by weight of the above methyl methacrylate resin using the method of A above.

C. A third formulation is made using 180 parts by weight of the polyvinylidene fluoride dispersion and 9.2 parts by weight of the acrylate resin. Gelation of the dispersion occurs indicating that the mutual compatibilities or solubility of acrylic are exceeded. Addition of 8 parts by weight of 4/1 wt./wt. dimethylphthalate-diisobutylketone mixture restores fluidity.

Formulations A, B, and C are tested for film casting and aluminum coatings using the methods of Example 1 and tough, translucent to transparent coatings and films are obtained.

Example 12

The following mixture is ball milled for 16 hr. (29 (r.p.m.):

| | Parts by weight |
|---|---|
| Polyvinylidene fluoride powder (1–3 microns particle diameter) | 45 |
| Polyethyl methacrylate (having an inherent viscosity of 0.91 at 0.5% concentration in chloroform at 20° C.) | 5 |
| Cyclohexanone | 50 |

The product obtained is a white, slightly tacky dispersion with a viscosity in the 50,000 cp. range.

When used as a coating as in Example 2 above, strongly adherent, abrasion resistant coatings are obtained.

It will be understood that numerous changes may be made from the above description and examples without departing from the spirit and the scope of the invention.

We claim:

1. A composition comprising
   (a) a fluorinated olefin polymer containing at least about 90% by weight of vinylidene fluoride moieties,
   (b) a latent solvent for said fluorine containing polymer,
   (c) an acrylate polymer derived from a monomer of structure

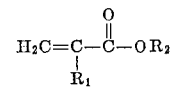

where $R_1$ is selected from the group consisting of hydorgen and methyl, and $R_2$ is alkyl containing from one to four carbon atoms, said acrylate polymer being dissolved in said latent solvent, said fluorine containing polymer being dispersed in said acrylate solution, said total polymers comprising from about 20% to about 60% by weight of said composition and said acrylate polymer being from about 1% to about 25% by weight of said total polymers.

2. A composition comprising
   (a) a fluorinated olefin polymer containing at least about 90% by weight of vinylidene fluoride moieties, the balance being tetrafluoroethylene moieties,
   (b) a latent solvent for said fluorine containing polymer,
   (c) an acrylate polymer selected from the group consisting of (1) homopolymers derived from a monomer of structure

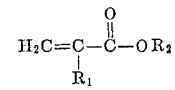

where $R_1$ is selected from the group consisting of hydrogen and methyl, and $R_2$ is selected from the group consisting of hydrogen and methyl, and $R_2$ is alkyl containing from one to four carbon atoms, and (2) copolymers of said acrylic monomer with up to about 40% by weight of a second acrylic monomer, said acrylate polymer being dissolved in said latent solvent, said fluorine containing polymer being dispersed in said acrylate solution, said total polymers comprising from about 20% to about 60% by weight of said composition and said acrylate polymer being from about 1% to about 25% by weight of said total polymers.

3. A composition comprising
(a) a polyvinylidene fluoride polymer,
(b) a latent solvent for said fluorine containing polymer,
(c) an acrylate polymer derived from a monomer of structure

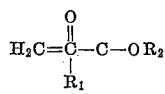

where $R_1$ is selected from the group consisting of hydrogen and methyl, and $R_2$ is alkyl containing from one to four carbon atoms, said acrylate polymer being dissolved in said latent solvent, said fluorine containing polymer being dispersed in said acrylate solution, said total polymers comprising from about 20% to about 60% by weight of said composition and said acrylate polymer being from about 1% to about 25% by weight of said total polymers.

4. A composition as in claim 3 wherein the latent solvent is dimethylphthalate.
5. A composition as in claim 3 wherein the latent solvent is isophorone.
6. A composition as in claim 3 wherein the latent solvent is a mixture of dimethylphthalate and diisobutyl-ketone.
7. A composition as in claim 3 wherein the latent solvent is a mixture of dimethylphthalate and diethylene glycol monoethyl ether acetate.
8. A composition as in claim 3 wherein the latent solvent is diethylene glycol monoethyl ether acetate.
9. A composition as in claim 3 wherein the latent solvent is cyclohexanone.

References Cited

UNITED STATES PATENTS

| 2,849,412 | 9/1958 | Robb | 260—31.8 |
| 2,866,721 | 12/1958 | Hetherington | 260—31.8 |
| 3,074,901 | 1/1963 | Lantos | 260—31.8 |
| 3,178,399 | 4/1965 | Lo | 260—900 |
| 3,253,060 | 5/1966 | Koblitz | 260—900 |

OTHER REFERENCES

The Technology of Solvents by Doolittle, 1954, J. Wiley and Sons, pp. 523, 452, 453.

MORRIS LIEBMAN, *Primary Examiner.*

J. FROME, *Assistant Examiner.*